March 12, 1957  A. D. HAAS  2,784,437
WINDSHIELD WIPER
Filed July 27, 1955
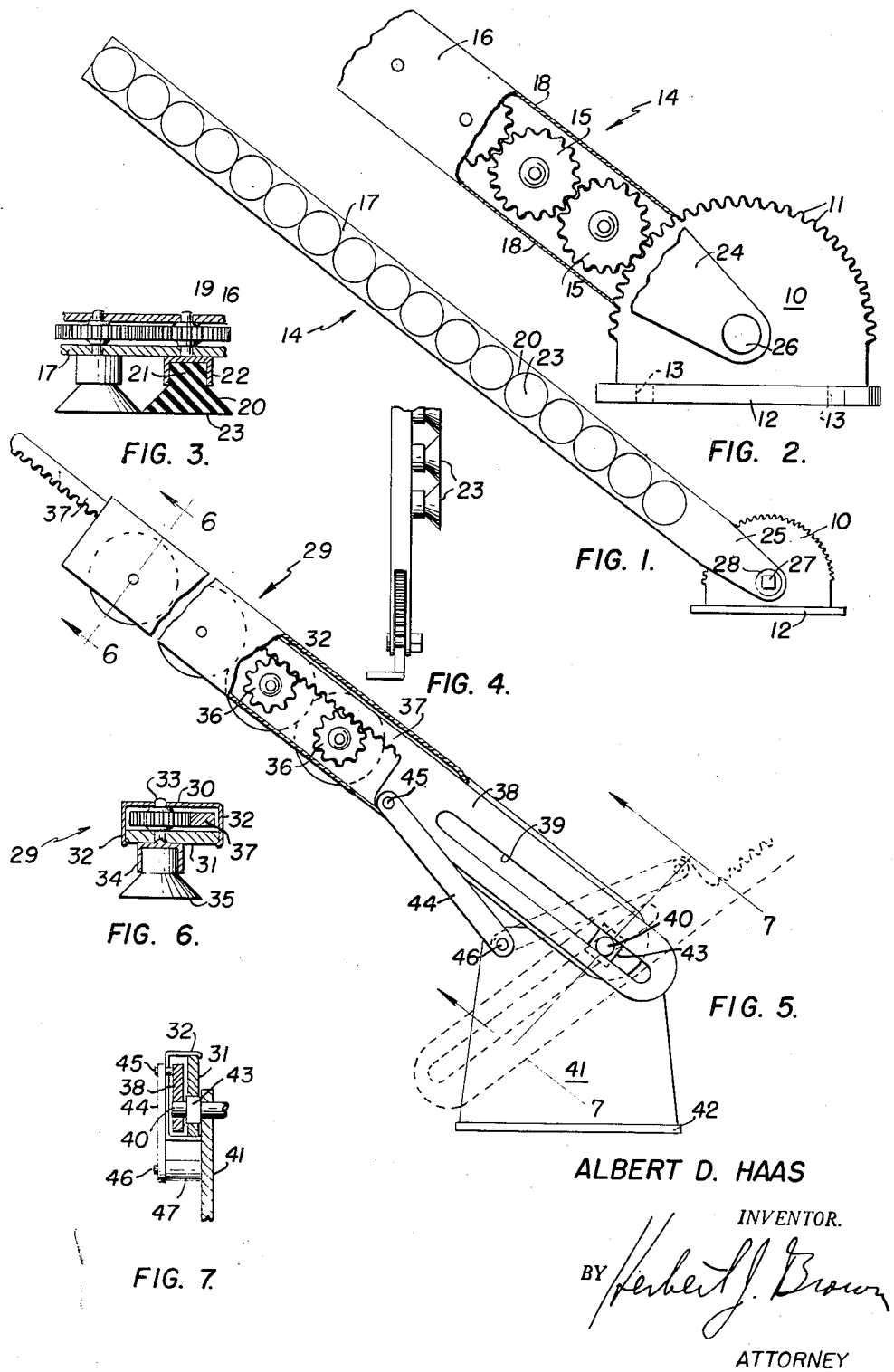
ALBERT D. HAAS
INVENTOR.
BY Herbert J. Brown
ATTORNEY

United States Patent Office 2,784,437
Patented Mar. 12, 1957

2,784,437

WINDSHIELD WIPER

Albert D. Haas, Fort Worth, Tex.

Application July 27, 1955, Serial No. 524,652

3 Claims. (Cl. 15—254)

This invention relates to windshield wipers and has for its principal object the provision of a wiper which will not streak windshields during its operation. Additionally, the invention is capable of removing snow and ice as the same forms on a windshield and is also capable of removing visual obstructions caused by spattered bugs. By reason of its multiple arrangement of resilient wiping units, the present wiper is capable of wiping curved windshield surfaces of modern automobiles.

These and other objects will become apparent from the following description and accompanying drawing, wherein:

Figure 1 is a rear elevation of a preferred embodiment of the invention.

Figure 2 is an enlarged broken elevation and sectional view of the front inner portion of the wiper shown in Figure 1.

Figure 3 is a broken longitudinal sectional view of the wiper arm of the preferred form of the invention.

Figure 4 is a broken elevation taken at a right angle with respect to the lower portion of Figure 1.

Figure 5 is a broken front elevation and sectional view of a modified form of the invention.

Figure 6 is a transverse sectional view taken on line 6—6 of Figure 5.

Figure 7 is a transverse sectional view taken approximately on line 7—7 of Figure 5.

The preferred form of the invention shown in Figures 1 through 4 includes an arcuate support 10 in the form of a plate having gear teeth 11 around the curved portion of its periphery. The plate 10 is secured to the frame of a windshield by means of a transverse mounting plate 12 having holes 13 for receiving attaching screws, not shown. The arm 14 is hollow and provides a support for a train of gears 15 which mesh with each other, and the innermost gear of which meshes with the teeth 11 of the arcuate support 10. The arm 14 includes forward and rear sides 16 and 17 spaced from each other by side walls 18 along the edges thereof. The gears 15 are mounted within the arm 14 by means of pins 19 through their centers and which pins are journaled in and extend through the forward and rear sides 16 and 17. The ends of the pins 19 extending through the rear side 17 of the arm 14 support circular resilient units 20 which are, in the preferred form of the invention, generally conical, and the apexes 21 of which are cylindrical and are received and secured in cylindrical cup shaped sockets 22, which in turn, are secured to the ends of said pins. The base portions 23 of the resilient units 20 are flat and the peripheries of which contact the adjoining peripheries of adjacent said units.

The inner ends of the front and rear sides 16 and 17 are provided with longitudinally extending ears 24 and 25 through which the drive shaft 26 extends. The inner end of the drive shaft 26 is provided with a square drive 27 for connection with a conventional oscillating source of power for windshield wipers. The latter may be either in the form of an electric motor, cable or other oscillating driving means. As shown in Figure 1, the drive 26 is provided with a circular boss 28 which is pressed into or otherwise carried to the rear wiper arm ear 25.

The form of the invention shown in Figures 5 through 7 also includes an arm 29 having an outer side 30, an inner side 31 and connecting sides 32, together with pins 33 mounted therethrough and having cup shaped sockets 34 secured thereon for supporting resilient wiper units 35, the latter being the same as previously described in connection with the preferred form of the invention.

Pinion gears 36 are secured to the pins 33, and which gears do not mesh with each other; instead, the pinions 36 mesh with a rack gear 37 slidably received in the arm 29 and along one side thereof. The inner end of the rack gear 37 is enlarged, as at 38, where it is provided with a longitudinal slot 39 for sliding engagement with a drive shaft 40. The drive shaft 40 is journaled in a supporting plate 41 having a flanged plate 42 for attaching the assembly to the frame of a windshield. As shown in Figures 5 and 7, the drive shaft 40 includes a square boss 43 secured in a square hole in the inner side 31 of the arm assembly 29. The inner end of the arm 29 is open at its sides and a connecting arm 44 is pivotally connected between the enlarged portion 38 of the rack 37 and a corner of the supporting plate 41. The connecting arm 44 is pivotally secured in the described position by means of pivot pins 45 and 46. The latter pin 46 is maintained in alignment by means of a spacer 47 between the connecting arm 44 and the support 41. As shown in Figure 5, the drive shaft 40 is located to one side of the supporting plate 41 and the last referred to pivot pin 46 is spaced therefrom, the said shaft and said pin being substantially equidistant from the mounting plate 42.

The operation of the form of the invention shown in Figures 1 through 4 consists of oscillating the arm 14 over an area of a windshield with the rotatable circular units 20 in contact therewith. As the arm 14 moves, the gears 15 in meshing contact with each other and with the teeth 11 of the support 10 cause the wiper units 20 to rotate. As compared with a conventional blade comprising a length of rubber in contact with a windshield, the present invention multiplies the peripheral contact by reason of the rotation of the units 20. Thus, bugs, snow and ice are quickly and easily removed as they accumulate on the windshield.

The operation of the form of the invention illustrated in Figures 5 through 7 is also directed to rotation of the wiper units 35 in contact with the outer surface of a windshield. As the drive shaft 40 oscillates the arm 29, the relative movement of the rack gear 37 with the pinions 36 causes the units 35 to rotate. The described linkage between the enlarged portion 38 of the rack 37, the sliding arrangement of the slot 39 therein with the said drive, together with the pivoted action with the connecting arm 44, causes the rack gear 37 to move relative to the pinions 36. As indicated in Figure 5 by means of dotted lines, the arm 29 may move through an arc over an area of a windshield.

The invention is not limited to the constructions herein shown and described, but may be made in various ways within the scope of the appended claims.

What is claimed is:

1. In a windshield wiper, a support adapted to be mounted on a vehicle adjacent the outer surface of a windshield, an arm pivotally mounted at one end thereof on said support, means oscillating said arm, resilient wiping units rotatably mounted on said arm, the axes of which are perpendicular to the length of said arm and perpendicular to the said surface of said windshield, said resilient wiping units being in sliding contact with said windshield, and means rotating said wiping units.

2. In a windshield wiper as defined in claim 1, the conclosed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042    Threewit _____ May 5, 1953

FOREIGN PATENTS 303,664    Germany _____ Feb. 11, 1918